UNITED STATES PATENT OFFICE.

MORLAND MICHOLL DESSAU, OF MERTON, ENGLAND.

SUBSTANCE PRODUCED FROM THE GUMS OF CERTAIN SAPOTACEÆ.

No. 886,482.   Specification of Letters Patent.   Patented May 5, 1908.

Application filed June 11, 1906. Serial No. 321,270.

*To all whom it may concern:*

Be it known that I, MORLAND MICHOLL DESSAU, a citizen of the United States of America, and residing at The Ferns, Merton, in the county of Surrey, England, have invented a certain new and useful Substance Produced From the Gums of Certain Sapotaceæ, of which the following is a specification.

This invention relates to the production of a new material from the gums of the *Sapotaceæ mimusops* as found in Brazil, Guiana and Venezuela or the *Sapotaceæ chrysophyllum* as found in Queensland, New South Wales and Mauritius Isles or from the *Muelleri* gums or a mixture of these.

The object of this invention is to produce a new material from these gums which shall have industrial properties intermediate between gutta percha and india-rubber.

The invention consists in a new material produced from the above mentioned gums by washing and heating in successive hot solutions of the salts of the alkaline metals, the substance so produced being finally cleaned, kneaded and cured. I find that the material thus produced is homogeneous and very tough possessing properties intermediate between gutta percha and india-rubber. It can be employed with great advantage as a diluent of india-rubber and a considerable proportion can be incorporated without substantial deterioration of the rubber. In fact, additions of this new substance is found with certain rubber to distinctly improve their qualities.

The invention further consists in the process of manufacturing this new product by first washing the more or less finely divided gum, then treating it with a hot or boiling bath of a solution of potassium nitrate ($KNO_3$), the product being subsequently treated with a hot alkaline bath of sodium silicate ($Na_2SiO_3$), potassium silicate ($K_2SiO_3$), borax ($Na_2B_4O_7$) or tungstate of soda ($Na_2WO_4$), then with a boiling bath of calcium hydrate [$Ca(HO)_2$], after which it is washed and mechanically treated to give it the desired form.

The invention further comprises the hereinafter described process for producing this new and improved elastic material.

According to one method, the gum is first cut or ground preferably into a finely divided state, and the bark, sand or other foreign matter separated by washing in water. The cleansed gum is then transferred to a hot bath composed of 5 parts of potassium nitrate ($KNO_3$) to 100 of water. This bath is maintained at boiling heat for about one hour till the gum becomes brown and stringy. After this, the solution of potassium nitrate ($KNO_3$) is drained off and the gum is then placed in a bath composed of 5 parts of sodium silicate ($Na_2SiO_3$), potassium silicate ($K_2SiO_3$), borax ($Na_2B_4O_7$), or tungstate of soda ($Na_2WO_4$), (the first mentioned silicates are, I find, preferable) dissolved in 100 parts of water. The water in both the baths mentioned above is preferably distilled.

Although I have given definite times of boiling in the various solutions I find that the toughness and other qualities of the product may be varied by varying these times. The second bath is kept boiling for from one hour to one hour and fifteen minutes, after which the solution is drained off and the gum is now of a red color, and, while hot, is slimy to the touch, but on cooling it becomes tough.

The gum is next transferred to a hot calcium hydrate [$Ca(OH)_2$] composed of 5 parts lime in 100 parts of water. The bath is kept boiling for about 1 hour, during which the gum toughens considerably.

The next part of the process consists in washing the gum in running water so as to remove all superfluous alkalies. The material thus cleansed is next transferred to a kneading mill and after being thoroughly kneaded it may be passed through rolls or calenders and formed into thin sheets. These thin sheets or tissues are cured and dried in a warm atmosphere, or the drying process may be accelerated by passing hot air in currents over the thin sheets. In some cases before curing the sheets and immediately after the kneading and rolling has been effected, the sheets are dipped in a weak nitric acetic or citric acid bath. This I find gives the surfaces a velvety and smooth finish. After drying, the thin sheets may be placed in layers and pressed into thick sheets and cut and trimmed as desired.

Having now described my invention, what I claim as new and desire to secure by Letters Patent is:—

1. Process of treating the gums of the *Sapotaceæ* consisting in washing the gum in water, treating the gum in a solution of a metallic nitrate, then subsequently in a solution of a metallic silicate after which the product is washed, cleansed and kneaded.

2. A process for treating the gums of the Sapotaceæ, consisting in washing the gum in water, treating the cleansed gum in a hot solution of metallic nitrate then subsequently in a hot solution of a metallic silicate after which the gum is washed, cleansed and kneaded.

3. A process of treating the gums of the Sapotaceæ, consisting in washing the gum in water, treating the cleansed gum in a solution of a metallic nitrate, then subsequently in a solution of a metallic silicate after which the material is washed in a calcium hydrate bath and then cleansed and kneaded.

4. Process for treating the gums of the Sapotaceæ, consisting in washing the gum in water, treating the cleansed gum in a solution of metallic nitrate, then subsequently in a solution of a metallic silicate after which the material is washed in a calcium hydrate bath, rolled into sheets, treated with an acid, then cleansed and mechanically treated as required.

5. Process for treating the gums of the Sapotaceæ, consisting in washing the gum in water, treating the cleansed gum in a hot solution of a metallic nitrate, then subsequently in a hot solution of a metallic silicate after which the material is washed in a calcium hydrate bath and then cleansed and kneaded.

6. Process for treating the gums of the Sapotaceæ, consisting in washing the gum in water, treating the cleansed gum in a hot solution of metallic nitrate, then subsequently in a hot solution of a metallic silicate after which the material is washed in a calcium hydrate bath, rolled into sheets, treated with an acid, then cleansed and mechanically treated as required.

7. Process for producing a new substance having properties intermediate gutta-percha and india-rubber consisting in washing the finely divided gums of the Sapotaceæ mimusops, Sapotaceæ chrysophyllum and Sapotaceæ muellerii, treating the cleansed material with a potassium nitrate bath, then in a bath containing an alkalimetal silicate, borate or tungstate, and finally with a boiling bath of calcium hydrate, after which the substance is washed and treated mechanically, substantially as described.

8. Process for producing a new substance having properties intermediate gutta-percha and india-rubber consisting in washing the finely divided gums of the Sapotaceæ mimusops, Sapotaceæ chrysophyllum and Sapotaceæ muellerii, treating the cleansed material with a hot potassium nitrate bath, then in a hot bath containing an alkali-metal silicate, borate or tungstate, and finally with a boiling bath of calcium hydrate after which the substance is washed and treated mechanically, substantially as described.

9. Process for producing a new substance having properties intermediate gutta-percha and india-rubber consisting in washing the finely divided gum of the Sapotaceæ mimusops, Sapotaceæ chrysophyllum and Sapotaceæ muellerii, treating the cleansed material in a boiling bath of 5 parts potassium nitrate to 100 water then with a boiling bath composed of 5 parts of an alkali-metal silicate borate or tungstate dissolved in 100 parts water, then in a boiling bath composed of 5 parts calcium oxid to 100 parts of water after which the material is washed, kneaded and otherwise treated mechanically.

10. Process for producing a new substance having properties intermediate gutta-percha and india-rubber consisting in washing the finely divided gum of the Sapotaceæ mimusops, Sapotaceæ chrysophyllum and Sapotaceæ muellerii treating the cleansed material in a boiling bath of 5 parts potassium nitrate to 100 water then with a boiling bath composed of 5 parts of an alkali-metal silicate, borate or tungstate dissolved in 100 parts water, then in a boiling bath composed of 5 parts calcium oxid to 100 parts of water washing the material in water and forming it into thin sheets, treating these sheets in an acid bath and subsequently curing, drying and otherwise treating mechanically, substantially as described.

11. In a process of treating the gums of Sapotaceæ, the steps consisting in washing the gum in water, subjecting the washed gum to a heated solution of a metallic nitrate, and then to successive hot solutions of the salts of the alkaline metals, and finally cleaning, kneading and curing the product.

In testimony whereof I have signed my name to this specification in the presence of two subscribing witnesses.

MORLAND MICHOLL DESSAU.

Witnesses:
ALBERT E. PARKER,
P. S. H. ALEXANDER.